United States Patent [19]

Hayata et al.

[11] Patent Number: 5,053,893
[45] Date of Patent: * Oct. 1, 1991

[54] METHOD OF AND DEVICE FOR DEMAGNETIZING MAGNETIC RECORDING MEDIUM

[75] Inventors: Youichi Hayata; Michihiro Matsui, both of Odawara, Japan

[73] Assignee: Fuji Photo Film Co., Ltd., Japan

[*] Notice: The portion of the term of this patent subsequent to Sep. 11, 2007 has been disclaimed.

[21] Appl. No.: 549,272

[22] Filed: Jul. 6, 1990

Related U.S. Application Data

[62] Division of Ser. No. 931,944, Nov. 19, 1986, Pat. No. 4,956,728.

[30] Foreign Application Priority Data

Jul. 16, 1984 [JP] Japan ............................ 59-147103

[51] Int. Cl.$^5$ .............................................. G11B 5/03
[52] U.S. Cl. ..................................... 360/66; 361/149; 361/267
[58] Field of Search ................................. 360/66, 118; 361/149-151, 267

[56] References Cited

U.S. PATENT DOCUMENTS 2,993,096  7/1961  Radocy ............................. 361/151
4,471,403  9/1984  Dress, Jr. et al. ................. 361/267
4,956,728  9/1990  Hayata et al. ..................... 361/66

FOREIGN PATENT DOCUMENTS 2613869  10/1977  Fed. Rep. of Germany ........ 360/66
55-50609  4/1980  Japan ................................. 361/267

Primary Examiner—A. D. Pellinen
Assistant Examiner—Richard Elms
Attorney, Agent, or Firm—Pasquale A. Razzano

[57] ABSTRACT

A magnetic recording medium such as a magnetic recording tape or disk is demagnetized by applying a saturating magnetic field to the magnetic recording medium, then applying an unsaturating magnetic field to the magnetic recording medium in a direction opposite to the direction of the saturating magnetic field, and finally applying an alternating magnetic field to the magnetic recording medium to remove residual magnetism which has been produced on the magnetic recording medium by the unsaturating magnetic field. The saturating, unsaturating, and alternating magnetic fields are generated respectively by a first DC erasing head, a second DC erasing head, and an AC erasing head, which are arranged at spaced intervals in the order named in the direction in which the magnetic recording medium is continuously moved.

3 Claims, 1 Drawing Sheet

METHOD OF AND DEVICE FOR DEMAGNETIZING MAGNETIC RECORDING MEDIUM

BACKGROUND OF THE INVENTION

1. Field of the invention

The present invention relates to a method of and a device for demagnetizing a magnetic recording medium, and more particularly to a method of and a device for removing residual magnetism from a magnetic recording medium with a plurality of erasing heads.

2. Description of the Prior Art

Signals are generally recorded on magnetic recording mediums such as magnetic tapes, magnetic disks, or the like by residual magnetism. The recorded signals can be erased by removing the residual magnetism under a magnetic field generated by an erasing head positioned closely to the magnetic recording medium.

One of the conventional ways for erasing the recorded magnetic signals is known as a DC erase process which utilizes either an erasing head with a direct current flowing through its coil or an erasing head having a permanent magnet. Such an erasing head produces a magnetic field in a prescribed direction to magnetize the magnetic recording medium uniformly until it is magnetically saturated. The DC erasing head is however disadvantageous in that it leaves noises of high level on the magnetic recording tape when erasing the recorded signals therefrom, thus increasing the distortion rate of signal waveforms which will be recorded and reproduced.

Another erasing process has been to use an AC erasing head having a coil supplied with an alternating current for magnetizing the magnetic recording medium as it passes the erasing head until the magnetic recording medium, is saturated. As the magnetic recording medium travels away from the AC erasing head, the recording medium is less subject to the alternating magnetic field produced by the AC erasing head, and hence the residual magnetism on the recording medium is progressively reduced and finally removed.

Where the magnetic recording head has a high coercive force, the AC erasing head is required to be supplied with an increased amount of electric power. When the AC erasing head is supplied with such increased electric power, however, it can produce only an insufficient magnetic field due to an eddy-current loss of the core, and cannot sufficiently eliminate the residual magnetism from the magnetic recording medium.

SUMMARY OF THE INVENTION

In view of the problems with the conventional degaussing methods, it is an object of the present invention to provide a method of demagnetizing a magnetic recording medium, which can remove residual magnetism from the magnetic recording medium with a small amount of electric power supplied, and does not leave a high level of noise on the magnetic recording medium at the time of degaussing the same, thereby maintaining the recorded and reproduced signal waveforms within the desired distortion rate.

Another object of the present invention is to provide a device for carrying out the above demagnetizing method.

According to a demagnetizing method of the present invention, a magnetic recording medium is demagnetized by applying a saturating magnetic field to the magnetic recording medium, applying an unsaturating magnetic field to the magnetic recording medium in a direction opposite to the direction of the saturating magnetic field, and applying an alternating magnetic field to the magnetic recording medium to remove residual magnetism which has been left on the magnetic recording medium by the unsaturating magnetic field. The saturating, unsaturating, and alternating magnetic fields are generated respectively by a first DC erasing head, a second DC erasing head, and an AC erasing head, which are arranged at spaced intervals in the order named in the direction in which the magnetic recording medium is continuously moved.

According to the present invention, a device for demagnetizing a magnetic recording medium comprises a first DC erasing head for applying a saturating magnetic field to the magnetic recording medium, a second DC erasing head for applying an unsaturating magnetic field to the magnetic recording medium in a direction opposite to the direction of the saturating magnetic field, and an AC erasing head for applying a alternating magnetic field to the magnetic recording medium to remove residual magnetism which has been left on the magnetic recording medium by the unsaturating magnetic field, the first DC erasing head, the second DC erasing head, and the AC erasing head being arranged at spaced intervals in the order named in the direction in which the magnetic recording medium is continuously moved.

Each of the DC erasing heads may comprise a pole piece and a coil wound therearound, the coil being supplied with a direct current. The AC erasing head may comprise a pole piece and a coil wound therearound, the coil being supplied with an alternating current.

In operation, the magnetic recording medium is magnetized in one direction by the first DC erasing head until it is saturated, and then is magnetized in the opposite direction by the second DC erasing head to leave a residual flux density of a small level on the magnetic recording medium. Thereafter, the alternating magnetic field is applied to the magnetic recording medium by the AC erasing head to eliminate the residual flux density. Since the AC erasing head produces only a weak alternating magnetic field, it is not required to be supplied with a large amount of electric power. Inasmuch as the current fed to the AC erasing head is small, the demagnetizing frequency can be increased, making it possible to degauss the magnetic recording medium while it runs at high speed.

The first DC erasing head applies the saturating magnetic field to the magnetic recording medium for producing residual magnetism in one direction and of a uniform level. Thereafter, the second DC erasing head uniformly applies the unsaturating magnetic field in the direction opposite to that of the saturating magnetic field, so that residual magnetism can have a substantially uniform level. Variations in the level of the residual magnetism can be reduced to a negligible extent by the alternating magnetic field which is subsequently generated by the AC erasing head. Therefore, level variations of the residual magnetism are finally extremely small.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
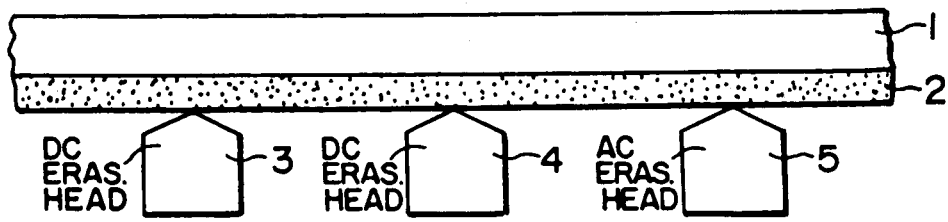
FIG. 1 is a schematic view of a demagnetizing device according to the present invention.

As shown in FIG. 1, a magnetic recording medium 1 such as a magnetic recording tape has a magnetic layer 2 on one surface thereof. A demagnetizing device of the invention has three erasing heads 3, 4 and 5 spaced from each other and positioned in sliding contact with the magnetic layer 2 when the magnetic recording tape 1 travels along its own path in the direction of the arrow A. The erasing head 3 is a DC erasing head for applying a saturating magnetic field to the magnetic layer 2. The erasing head 4 is a DC erasing head for applying an unsaturating magnetic field to the magnetic layer 2 in a direction opposite to the direction of the saturating magnetic field produced by the erasing head 3. The erasing head 5 is an AC erasing head for applying an alternating magnetic field to the magnetic layer 2 for removing the residual magnetism which has been left on the magnetic layer 2 by the unsaturating magnetic field generated by the erasing head 4.

Figure 2:
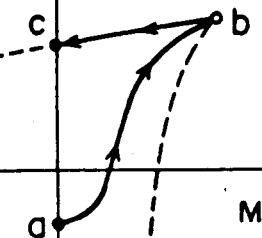
FIGS 2, 3 and 4 are diagrams showing B-H curves which indicate the influences of the magnetic fields produced by erasing heads, respectively, of the demagnetizing device shown in FIG. 1.
Figure 3:
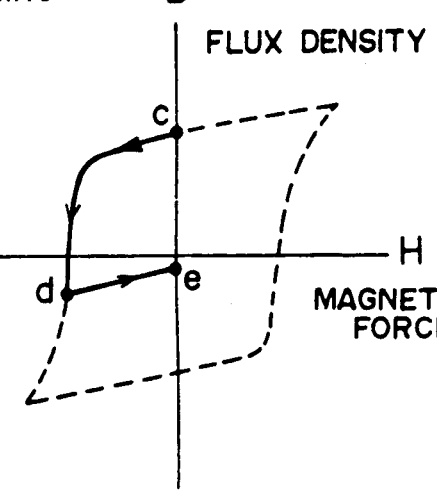
Figure 4:
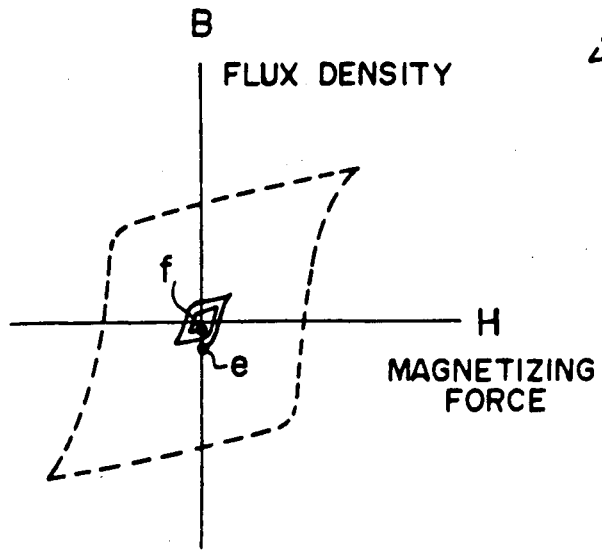

The manner in which the residual magnetism on the magnetic layer 2 varies under the magnetic fields given by the erasing heads 3, 4 and 5 will be described with reference to FIGS. 2, 3 and 4 which show successive B-H curves of the magnetic layer 2.

It is assumed that a region of the magnetic layer 2 has a residual flux density of a level a (FIG. 2) at the time signals are magnetically recorded on the tape 1. The tape 1 travels in the direction of the arrow A in sliding contact with the erasing heads 3, 4 and 5 for degaussing the tape 1. When the region of the magnetic layer 2 reaches the erasing head 3, the magnetic layer region is subject to a saturating magnetic field generated by the erasing head 3 and has a residual flux density of a level b (FIG. 2). As the magnetic layer region continuously goes in the direction of the arrow A, it is no longer subject to the magnetic field of the erasing head 3. However, the residual flux density in the magnetic layer region is not completely eliminated but has a level c (FIG. 2).

When the magnetic layer region arrives at the erasing head 4, the erasing head 4 applies an unsaturating magnetic field to the magnetic layer region in a direction opposite to the direction of the saturating magnetic field given by the erasing head 3. The magnetic layer region now has a residual flux density of a level d (FIG. 3). When the magnetic layer region moves on in the direction of the arrow A, it is no longer influenced by the magnetic field of the erasing head 4. However, due to a localized variation in the magnetic layer properties, the magnetic layer region has a small residual flux density having a level e (FIG. 3).

Upon arrival of the magnetic layer region at the erasing head 5, it is subject to a weak alternating magnetic field generated by the erasing head 5. The residual flux density in the magnetic layer region now varies in the pattern of a small hysteresis loop as illustrated in FIG. 4.

Since the magnetic layer region is less subject to the alternating magnetic field as it travels away from the erasing head 5 in the direction of the arrow A, the hysteresis loop becomes progressively smaller. When the magnetic layer region is moved to a position where the influence of the alternating magnetic field of the erasing head 5 is negligible, the residual flux density in the magnetic layer region has a level f (FIG. 4) which is substantially zero. The magnetic layer region is now degaussed substantially completely.

Since the signals are recorded continuously on the tape 1, successive regions of the magnetic layer 2 can be demagnetized in the foregoing manner.

Each of the DC erasing heads 3, 4 normally comprises a pole piece and a coil wound therearound, the coil being supplied with direct current. However, the DC erasing heads 3, 4 may instead be composed of permanent magnets, which are advantageous in that the erasing heads 3, 4 are not required to be electrically energized.

The magnetic recording medium 1 may comprise a magnetic recording disk rather than the magnetic recording tape.

Although a certain preferred embodiment has been shown and described, it should be understood that many changes and modifications may be made therein without departing from the scope of the appended claims.

What is claimed is:

1. A method of demagnetizing a magnetic recording medium, comprising the steps of:
   i) applying a saturating magnetic field to said magnetic recording medium;
   ii) applying an unsaturating magnetic field to said magnetic recording medium in a direction opposite to the direction of said saturating magnetic field; and
   iii) applying an alternating magnetic field to said magnetic recording medium to remove residual magnetism which has been left on the magnetic recording medium by said unsaturating magnetic field.

2. A method of demagnetizing a magnetic recording medium, comprising the steps of:
   i) moving said magnetic recording medium in one direction in sliding contact successively with a first DC erasing head, a second DC erasing head, and an AC erasing head in the order named;
   ii) applying a saturating magnetic field to said magnetic recording medium with said first DC erasing head;
   iii) applying an unsaturating magnetic field to said magnetic recording medium with said second DC erasing head in a direction opposite to the direction of said saturating magnetic field; and
   iv) applying an alternating magnetic field to said magnetic recording medium with said AC erasing head to remove residual magnetism which has been left on the magnetic recording medium by said unsaturating magnetic field.

3. A device for demagnetizing a magnetic recording medium, comprising:
   i) a first DC erasing head for applying a saturating magnetic field to said magnetic recording medium;
   ii) a second DC erasing head for applying an unsaturating magnetic field to said magnetic recording medium in a direction opposite to the direction of said saturating magnetic field; and iii) an AC erasing head for applying an alternating magnetic field to said magnetic recording medium to remove residual magnetism which has been left on the magnetic recording medium by said unsaturating magnetic field, said first DC erasing head, said second DC erasing head, and said AC erasing head being arranged at spaced intervals in the order named in the direction in which said magnetic recording medium is continuously moved.

* * * * *